US011263709B2

(12) United States Patent
Sugie et al.

(10) Patent No.: US 11,263,709 B2
(45) Date of Patent: Mar. 1, 2022

(54) SUPPLY INFORMATION COMMUNICATION SYSTEM, COMMUNICATION MODULE, LIQUID SUPPLY FACILITY, AND SUPPLY INFORMATION COMMUNICATION METHOD

(71) Applicant: TOYOTA JIDOSHA KABUSHIKI KAISHA, Toyota (JP)

(72) Inventors: Kazuki Sugie, Toyota (JP); Harufumi Muto, Miyoshi (JP); Yosuke Hashimoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 409 days.

(21) Appl. No.: 15/929,175

(22) Filed: Dec. 5, 2019

(65) Prior Publication Data

US 2020/0265528 A1 Aug. 20, 2020

(30) Foreign Application Priority Data

Feb. 18, 2019 (JP) .............................. JP2019-026342

(51) Int. Cl.
G06Q 50/06 (2012.01)
G06Q 10/08 (2012.01)
G06Q 20/10 (2012.01)

(52) U.S. Cl.
CPC ......... *G06Q 50/06* (2013.01); *G06Q 10/0833* (2013.01); *G06Q 20/102* (2013.01)

(58) Field of Classification Search
CPC .. G06Q 50/06; G06Q 10/0833; G06Q 20/102; G06Q 20/145; G07F 13/025; B60K 15/035; B60K 2015/0358
See application file for complete search history.

(56) References Cited

U.S. PATENT DOCUMENTS

| 4,263,945 A * | 4/1981 | Van Ness ............... B67D 7/348 |
| | | 137/234.6 |
| 2014/0121893 A1* | 5/2014 | Larschan ............... G07C 5/008 |
| | | 701/33.4 |

FOREIGN PATENT DOCUMENTS

| JP | 11-37822 A | 2/1999 |
| JP | 2000-28417 A | 1/2000 |

* cited by examiner

*Primary Examiner* — Yuhui R Pan
(74) *Attorney, Agent, or Firm* — Oblon, McClelland, Maier & Neustadt, L.L.P.

(57) ABSTRACT

A supply information communication system, a communication module, a liquid supply facility, and a supply information communication method are provided. The communication module is mounted on a vehicle to which liquid is supplied from the liquid supply facility. An obtaining section of the liquid supply facility obtains identifying information for identifying the vehicle that is a supply destination of the liquid discharged by a supplying section. A transmitting section of the liquid supply facility transmits supply information to the vehicle identified by the identifying information. The supply information includes information indicating that the liquid has been supplied. The communication module includes a receiving section and a storing section. The receiving section receives the supply information addressed to the vehicle on which the communication module is mounted. The storing section stores the received supply information.

13 Claims, 4 Drawing Sheets

SUPPLY INFORMATION COMMUNICATION SYSTEM, COMMUNICATION MODULE, LIQUID SUPPLY FACILITY, AND SUPPLY INFORMATION COMMUNICATION METHOD

BACKGROUND

1. Field

The present disclosure relates to a supply information communication system, a communication module, a liquid supply facility, and a supply information communication method.

2. Description of Related Art

Japanese Laid-Open Patent Publication No. 11-37822 discloses an in-vehicle liquid amount detector that detects the amount of fuel in the fuel tank of a vehicle. The in-vehicle liquid amount detector detects the amount of fuel in the fuel tank by detecting the liquid level in the fuel tank.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A supply information communication system is provided that includes a liquid supply facility configured to supply liquid to a vehicle and a communication module configured to be mounted on the vehicle, to which the liquid is supplied from the liquid supply facility. The liquid supply facility includes a supplying section configured to discharge the liquid, an obtaining section configured to obtain identifying information for identifying the vehicle that is a supply destination of the liquid discharged by the supplying section, and a transmitting section configured to transmit supply information to the vehicle identified by the identifying information. The supply information includes information indicating that the liquid has been supplied. The communication module includes a receiving section configured to receive the supply information addressed to the vehicle on which the communication module is mounted, and a storing section configured to store the received supply information.

With this configuration, when the liquid supply facility has supplied liquid to the vehicle, the supply information, which includes information indicating that liquid has been supplied to the vehicle, is received by the receiving section of the communication module mounted on the vehicle. Thus, for example, when determining whether liquid has been supplied, a reliable determination is made by using the received supply information.

For example, in a vehicle equipped with the in-vehicle liquid amount detector disclosed in the above-mentioned document, the in-vehicle liquid amount detector may be configured to detect that fuel has been supplied to the fuel tank when the liquid level in the fuel tank detected by the in-vehicle liquid amount detector is raised. However, depending on the shape of the fuel tank or the amount of fuel, it may be impossible to detect supply of fuel to the vehicle since the liquid level in the fuel tank changes only slightly even if fuel is supplied. That is, whether fuel has been supplied cannot be accurately detected simply by detecting the liquid level in the fuel tank. This problem is not limited to fuel, but also allies to cases where any other type of liquid is supplied to the vehicle. The above-described configuration solves such a problem.

Example 2: In the supply information communication system of Example 1, the liquid supply facility includes a measuring section configured to measure a supplied amount of the liquid discharged by the supplying section to the vehicle that has been identified by the identifying information. The supply information includes information about the supplied amount of the liquid that has been measured by the measuring section.

With this configuration, the vehicle does not need to be equipped with a sensor that measures, for example, the supply amount of liquid supplied to the vehicle. The configuration allows the accurate amount of liquid that has been supplied to the vehicle to be acquired on the vehicle side based on the supply information received by the communication module.

Example 3: In the supply information communication system of Example 1 or 2, the liquid supply facility includes a unit price storing section configured to store information about a unit price of the liquid discharged by the supplying section. The supply information includes the information about the unit price of the liquid at the time when the liquid is supplied to the vehicle identified by the identifying information.

This configuration allows the unit price of the liquid to be acquired on the vehicle side at different times based on the supply information received by the communication module, for example, even if the unit price of the liquid varies each time the liquid is supplied to the vehicle.

Example 4: In the supply information communication system of any one of Examples 1 to 3, the liquid supply facility includes a component storing section configured to store information about components of the liquid discharged by the supplying section. The supply information includes the information about the components the liquid at the time when the liquid is supplied to the vehicle identified by the identifying information.

This configuration allows the components of the liquid to be acquired on the vehicle side at different times based on the supply information received by the communication module, for example, even if the components of the liquid vary each time the liquid is supplied to the vehicle.

Example 5: In the supply information communication system of any one of Examples 1 to 4, the liquid supply facility includes a settling section configured to settle a fee for the liquid discharged by the supplying section to the vehicle. The supply information includes information about the fee that has been settled using the settling section.

This configuration allows the information about the fee for the liquid supplied to the vehicle to be acquired on the vehicle side.

Example 6: In the supply information communication system of Example 5, the obtaining section is configured to obtain, as the identifying information, information for identifying a user, the information having been obtained by the settling section at the time when the fee is settled using the settling section.

This configuration allows the obtaining section to obtain the identifying information for identifying the vehicle at the time of settlement using the settling section. Thus, it is not necessary to provide a device separate from the settling section to obtain the identifying information or to force the user to input the identifying information, for example, solely for the purpose of identifying the vehicle.

Example 7: The supply information communication system of any one of Examples 1 to 6 further includes a server configured to be connected to the communication module mounted on the vehicle via an external communication network. The server stores information about the vehicle and user information of the vehicle, the information about the vehicle and the user information of the vehicle being associated with each other. The obtaining section of the liquid supply facility is configured to obtain, as the identifying information, the user information of the vehicle to which the liquid has been discharged by the supplying section. The transmitting section of the liquid supply facility is configured to transmit the user information in association with the supply information. The server is configured to identify the vehicle based on the received user information and to transmit the supply information corresponding to the identified vehicle to the identified vehicle.

With this configuration, the vehicle to which the supplying section has supplied liquid is identified by the obtaining section obtaining the user information of the vehicle to which the supplying section has supplied the liquid. Thus, even if the obtaining section cannot directly obtain the information for identifying the vehicle to which the supplying section has supplied the liquid, the supply information is transmitted to the vehicle to which the supplying section has supplied the liquid.

Example 8: A supply information communication system is provided that includes a communication module and a portable manipulation terminal capable of communicating with the communication module. The communication module is mounted on a vehicle to which liquid is supplied from a liquid supply facility configured to supply the liquid to the vehicle. The portable manipulation terminal includes a settling section configured to be capable of settling a fee for the liquid between the portable manipulation terminal and the liquid supply facility, and a transmitting section configured such that, when the settling section settles the fee for the fuel, the transmitting section transmits supply information to a vehicle that is registered in the portable manipulation terminal in advance, the supply information including information that indicates that the liquid has been supplied to the vehicle. The communication module includes a receiving section configured to receive the supply information addressed to the vehicle on which the communication module is mounted, and a storing section configured to store the supply information received by the receiving section.

With this configuration, the communication module mounted on the vehicle receives the supply information indicating that the liquid has been supplied to the vehicle when the liquid is supplied to the vehicle at the liquid supply facility and the fee for the liquid is settled. Thus, for example, when determining whether liquid has been supplied to the vehicle, a reliable determination is made by using the supply information received by the receiving section.

Example 9: A communication module mounted on a vehicle is provided. The communication module includes a receiving section and a storing section. The receiving section is configured to receive supply information. When liquid is supplied to the vehicle from a liquid supply facility, the supply information is transmitted to the vehicle on which the communication module is mounted from the liquid supply facility. The supply information includes information indicating that the liquid has been supplied to the vehicle. The storing section configured to store the supply information received by the receiving section.

With this configuration, the communication module mounted on the vehicle receives the supply information indicating that the liquid has been supplied to the vehicle when the liquid is supplied to the vehicle at the liquid supply facility. Thus, for example, when determining whether liquid has been supplied, a reliable determination is made by using the received supply information.

Example 10: A liquid supply facility configured to supply liquid to a vehicle is provided. The liquid supply facility includes a supplying section, an obtaining section, and a transmitting section. The supplying section is configured to discharge the liquid to the vehicle. The obtaining section is configured to obtain identifying information. The identifying information is information for identifying the vehicle that is a supply destination of the liquid discharged by the supplying section. The transmitting section is configured to transmit supply information to the vehicle identified by the identifying information obtained by the obtaining section. The supply information includes information indicating that the liquid has been supplied to the vehicle.

With this configuration, the supply information indicating that the liquid has been supplied to the vehicle is transmitted to the vehicle when the liquid is supplied to the vehicle at the liquid supply facility. Thus, for example, when determining whether liquid has been supplied to the vehicle, a reliable determination is made on the vehicle side by using the received supply information.

Example 11: A method is provided that performs the various processes described in any one of Examples 1 to 7.

Example 12: A method is provided that performs the various processes described in Examples 8.

Example 13: A non-transitory computer readable memory medium is provided that stores a program that causes a processing device to perform the various processes described in any one of Examples 1 to 7.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
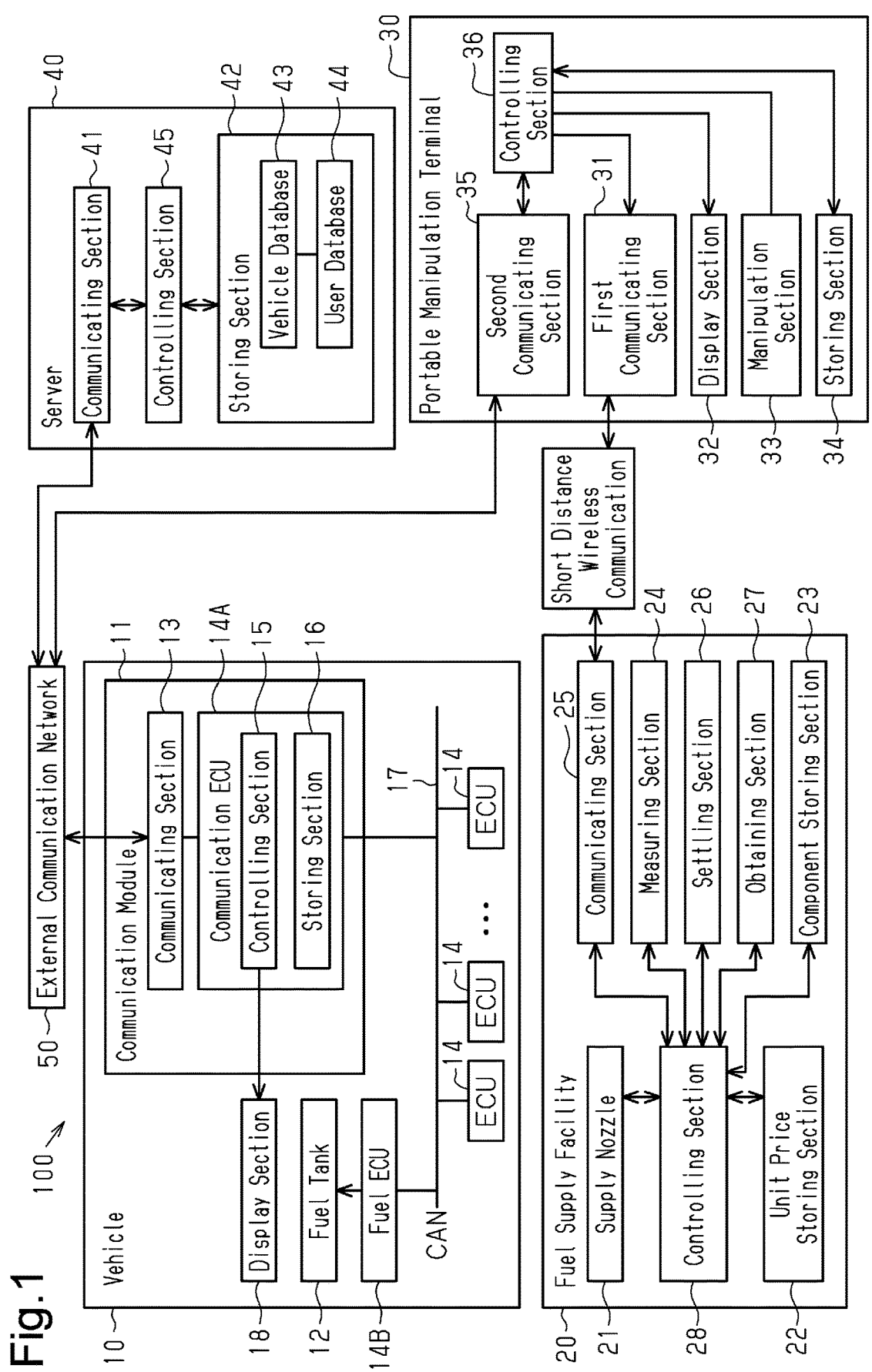
FIG. 1 is a schematic diagram of a supply information communication system according to a first embodiment of the present disclosure.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A supply information communication system 100 according to a first embodiment of the present disclosure will now be described with reference to FIGS. 1 and 2.

First, the overall configuration of the supply information communication system 100 will be described. As shown in FIG. 1, the supply information communication system 100 includes a communication module 11 mounted on a vehicle 10, a fuel supply facility 20, a portable manipulation terminal 30, and a server 40, which aggregates and stores information about the vehicle 10. The communication module 11, the portable manipulation terminal 30, and the server 40 are configured to communicate information with each other via an external communication network 50. The fuel supply facility 20 and the portable manipulation terminal 30 are configured to communicate information with each other via short distance wireless communication.

Figure 2:
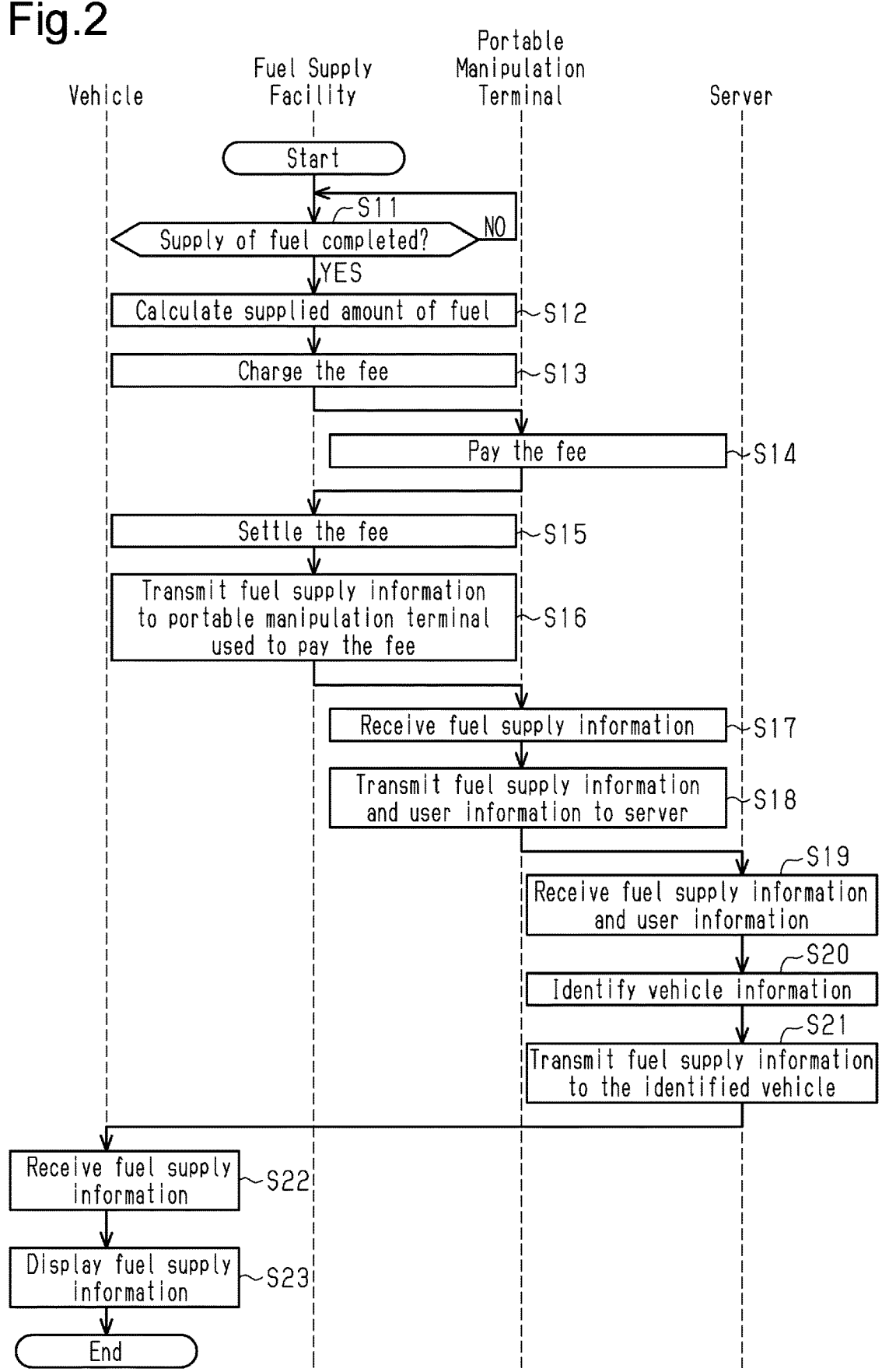
FIG. 2 is a flowchart showing a notification process of supply information according to the first embodiment.

As shown in FIG. 1, the vehicle 10 includes a fuel tank 12, which stores liquid fuel such as light oil, gasoline, and alcohol fuel. The fuel tank 12 is refilled by being supplied with fuel from the fuel supply facility 20. Although not illustrated, the fuel tank 12 incorporates a liquid level sensor that measures the liquid level of fuel.

The communication module 11 mounted on the vehicle 10 includes a communicating section 13 that communicates information with the server 40 via the external communication network 50. In the first embodiment, the external communication network 50 is a mobile telephone communication network. The communicating section 13 functions as a receiving section that receives information and a transmitting section that transmits information.

The communication module 11 mounted on the vehicle 10 includes a communication ECU 14A that controls information communication by the communicating section 13. The communication ECU 14A includes a controlling section 15 that controls information communication with the server 40 by the communicating section 13, transmission and reception of signals between the communication ECU 14A and ECUs 14, and executes various types of calculations. The ECUs 14 will be discussed below. The communication ECU 14A includes a storing section 16 that stores information received by the communicating section 13 and input to the controlling section 15 and results calculated by the controlling section 15.

The communication ECU 14A of the communication module 11 is connected to a CAN communication line 17 of a CAN communication system. The multiple ECUs 14, which control the vehicle 10, are connected to the CAN communication line 17. That is, the communication ECU 14A is one of the multiple ECUs 14. The communication ECU 14A is thus configured to transmit and receive various types of signals to and from the other ECUs 14 via the CAN communication line 17.

The multiple ECUs 14 of the vehicle 10 include a fuel ECU 14B that monitors the property and the remaining amount of the fuel stored in the fuel tank 12 of the vehicle 10. Specifically, the fuel ECU 14B determines whether fuel is being supplied to the fuel tank 12 and the remaining amount of fuel in the fuel tank 12 based on the detection value of the liquid level sensor of the fuel tank 12 and information received by the communicating section 13 of the communication module 11. The fuel ECU 14B determines the property of the fuel stored in the fuel tank 12. The property of fuel, for example, refers to the octane number, the cetane number, the ethanol concentration, and the contained amount of metal ions. The fuel ECU 14B calculates the fee for the fuel supplied to the fuel tank 12 based on the information received by the communicating section 13 of the communication module 11.

The vehicle 10 includes a display section 18, which displays output from the controlling section 15 of the communication ECU 14A. The display section 18 displays text messages or message marks based on the image information output from the controlling section 15. In the first embodiment, the display section 18 is the display of a car navigation system.

The fuel supply facility 20 includes a supply nozzle 21 that discharges (supplies) fuel to the fuel tank 12 of the vehicle 10. The distal end portion of the spout of the supply nozzle 21 is inserted into the supply port that opens to the fuel tank 12 of the vehicle 10, so that fuel can be supplied to the fuel tank 12 from the distal end portion of the supply nozzle 21. The supply nozzle 21 includes a lever (not shown), which is squeezed to allow fuel to be discharged from the distal end portion of the supply nozzle 21. In the present embodiment, the supply nozzle 21 functions as a supply portion that discharges liquid fuel.

The fuel supply facility 20 includes a unit price storing section 22, which stores the unit price of the fuel discharged from the supply nozzle 21. The unit price of the fuel stored in the fuel supply facility 20 varies depending on the period, so that the unit price stored in the unit price storing section 22 is updated as needed.

The fuel supply facility 20 includes a component storing section 23, which stores the components of the fuel discharged from the supply nozzle 21. The components of the fuel stored in the fuel supply facility 20 vary depending on the period, so that the components stored in the component storing section 23 is updated as needed.

The fuel supply facility 20 includes a measuring section 24, which measures the supplied amount (discharged amount) of fuel discharged to the fuel tank 12 of the vehicle 10 by the supply nozzle 21. Specifically, the measuring section 24 uses a flow rate sensor incorporated in the fuel supply facility 20 to measure the supplied amount of fuel discharged to the fuel tank 12 of the vehicle 10 by the supply nozzle 21. Each time the fuel supply facility 20 supplies fuel to a vehicle, the measuring section 24 measures the supplied amount from when the supply nozzle 21 starts supplying fuel to the vehicle to when the fuel supply is finished.

The fuel supply facility 20 includes a communicating section 25 that communicates information with the portable manipulation terminal 30 via short distance wireless communication. In the present embodiment, the short distance wireless communication is a technology referred to as near field communication (NFC) or radio frequency identifier (RFID) communication.

The fuel supply facility 20 includes a settling section 26 that settles the fee for the fuel supplied to the vehicle 10. Specifically, the settling section 26 transmits information related to the settlement of the fee for fuel to the portable manipulation terminal 30 via the communicating section 25. When receiving a notification indicating completion of the settlement via the communicating section 25, the settling section 26 determines that the settlement of the fee for fuel has been completed.

The fuel supply facility 20 includes an obtaining section 27, which obtains identifying information for identifying the vehicle 10 that is a supply destination of fuel discharged by the supply nozzle 21. Specifically, the obtaining section 27 obtains the ID information of the portable manipulation terminal 30 as the identifying information for identifying the vehicle 10. The ID information of the portable manipulation terminal 30 is the terminal number uniquely assigned to each portable manipulation terminal 30. In the present embodiment, the communicating section 25 receives notification that the settlement has been completed from the portable manipulation terminal 30. At this time, the terminal number of the portable manipulation terminal 30 is transmitted to the communicating section 25. When the communicating section 25 receives the notification that the settlement has been completed from the portable manipulation terminal 30 via short distance wireless communication, the obtaining section 27 obtains the terminal number of the portable manipulation terminal 30 transmitted to the communicating section 25 together with the notification that the settlement has been completed.

The fuel supply facility 20 includes a controlling section 28 that controls fuel supplying operation of the supply nozzle 21 and performs various calculations. The controlling section 28 calculates the fee for the fuel supplied to the vehicle 10 based on the supplied amount of the fuel discharged to the fuel tank 12 of the vehicle 10 by the supply nozzle 21 and the unit price of the fuel stored in the unit price storing section 22. That is, the controlling section 28 calculates the fee for the supplied amount of fuel measured by the measuring section 24.

The controlling section 28 determines that the supply nozzle 21 has started supplying fuel when the supply nozzle 21 has discharged an amount of fuel greater than or equal to the minimum amount of fuel that can be measured by the measuring section 24. The controlling section 28 determines that the supply nozzle 21 has finished supplying fuel when the supply nozzle 21 is put back to the nozzle holder in the fuel supply facility 20. In the present embodiment, the minimum amount that can be measured by the measuring section 24 is 10 milliliters (10 μm$^3$).

The controlling section 28 generates fuel supply information to be transmitted by the communicating section 25. The fuel supply information includes information indicating that fuel has been supplied to the vehicle 10, the amount of fuel supplied to the vehicle 10, the unit price of the fuel supplied to the vehicle 10, the components of the fuel supplied to the vehicle 10, and the fee for the fuel supplied to the vehicle 10.

The controlling section 28 transmits, from the communicating section 25, the fuel supply information generated by the controlling section 28 to the portable manipulation terminal 30 corresponding to the terminal number obtained by the obtaining section 27. Immediately after settlement is completed between the portable manipulation terminal 30 and the controlling section 28, the controlling section 28 associates the terminal number received by the controlling section 28 from the portable manipulation terminal 30 with the fuel supply information and transmits the fuel supply information to the portable manipulation terminal 30 corresponding to the terminal number. In this manner, the communicating section 25 and the controlling section 28 operate as a transmitting section of the fuel supply facility 20 that is configured to transmit the supply information including information indicating that fuel has been supplied to the vehicle 10 that has been identified using the identifying information for identifying the supply destination of fuel.

In the first embodiment, the portable manipulation terminal 30 is a mobile phone such as a smartphone owned by the user of the vehicle 10. The portable manipulation terminal 30 includes a first communicating section 31 that communicates information with the fuel supply facility 20 via short distance wireless communication. The first communicating section 31 communicates with the communicating section 25 of the fuel supply facility 20 via communication of the same standard as the communicating section 25. If the portable manipulation terminal 30 is held inside the communication range of the communicating section 25 of the fuel supply facility 20 while the communicating section 25 of the fuel supply facility 20 is charging the fee for fuel, the first communicating section 31 transmits the payment information of the fuel fee and the terminal number of the portable manipulation terminal 30. The first communicating section 31 receives the fuel supply information transmitted by the communicating section 25 of the fuel supply facility 20 and the terminal number associated with the fuel supply information.

The portable manipulation terminal 30 includes a display section 32, which displays output from a controlling section 36, which will be discussed below. The display section 32 displays messages and operation icons based on the image information output from the controlling section 36.

The portable manipulation terminal 30 includes a manipulation section 33 for inputting information to the controlling section 36, which will be discussed below. When the manipulation section 33 is manipulated, a manipulation signal is input to the controlling section 36. In the present embodiment, the display section 32 is a touch panel that also serves as the manipulation section 33.

The portable manipulation terminal 30 includes a storing section 34 that stores application programs and various types of data. When a signal for launching an application program is input to the controlling section 36 from the manipulation section 33 or the fuel supply facility 20, the application program stored in the storing section 34 is executed.

The portable manipulation terminal 30 includes a second communicating section 35, which communicates information with the server 40 via the external communication network 50.

The portable manipulation terminal 30 includes the controlling section 36, which controls information communications by the first and second communicating sections 31, 35 and performs various calculations.

When the first communicating section 31 receives charge information of the fee for fuel from the communicating section 25 of the fuel supply facility 20, the controlling section 36 executes a payment application program stored in the storing section 34. The controlling section 36 pays the charged fee by an electronic settlement means that has been registered beforehand by the user, for example, prepaid electronic money. When the payment of the fuel fee is completed by the electronic settlement means, the controlling section 36 controls the first communicating section 31 to transmit information indicating that the fuel fee has been paid. When transmitting the information indicating that the fuel fee has been paid from the first communicating section 31, the controlling section 36 also controls the first communicating section 31 to transmit the terminal number of the portable manipulation terminal 30. In this manner, the portable manipulation terminal 30 transmits the terminal number of the portable manipulation terminal 30. This allows the communicating section 25 of the fuel supply facility 20 to specify the terminal number of the portable manipulation terminal 30 as the transmission destination when transmitting the fuel supply information.

The controlling section 36 displays the fuel supply information received by the first communicating section 31 on the display section 32. Specifically, the controlling section 36 displays on the display section 32 the information about the fee for the supplied fuel, the information about the unit price of the supplied fuel, and the amount of the supplied fuel. The user can freely select displayed items of the information by manipulating the manipulation section 33.

The controlling section 36 transmits the fuel supply information received by the first communicating section 31 from the second communicating section 35 to the server 40 via the external communication network 50. When transmitting the fuel supply information from the second communicating section 35, the controlling section 36 also transmits user information stored in the storing section 34 of the portable manipulation terminal 30. Specifically, the user information is the terminal number of the portable manipulation terminal 30.

The server 40 includes a communicating section 41 that communicates information with the communication module 11 and the portable manipulation terminal 30 via the external communication network 50. The communicating section 41 receives the fuel supply information and the user information transmitted from the second communicating section 35 of the portable manipulation terminal 30.

The server 40 includes a storing section 42. The storing section 42 stores a vehicle database 43, which aggregates and manages information about vehicles, and a user database 44, which aggregates and manages user information. The storing section 42 stores association information that associates the vehicle information with the user information of vehicles. That is, the vehicle database 43 and the user database 44 associate the information about the vehicle 10 with the user data of the vehicle 10. Thus, the user information transmitted from the portable manipulation terminal 30 functions as the identifying information for identifying the vehicle 10. The information about the vehicle 10 is the communication address of the communication module 11 mounted on the vehicle 10 or the license plate number.

In the server 40, the information about the vehicle 10 received by the communicating section 41 is transmitted to the controlling section 45. The controlling section 45 thus acquires the information about the vehicle 10. Based on the information about the vehicle 10, the controlling section 45 identifies the vehicle user information that is stored in the storing section 42 in association with the information about the vehicle 10. This allows the controlling section 45 to transmit information from the communicating section 41 to the portable manipulation terminal 30 owned by the identified user.

Further, in the server 40, when the communicating section 41 receives the user information of the vehicle 10, the user information of the vehicle 10 is transmitted to the controlling section 45. The controlling section 45 thus acquires the user information of the vehicle 10. Based on the user information of the vehicle 10, the controlling section 45 identifies the information about the vehicle 10 that is stored in the storing section 42 in association with the user information. This allows the server 40 to transmit the information addressed to the vehicle 10 from the communicating section 41 to the communication module 11 mounted on the identified vehicle 10.

The server 40 includes the controlling section 45, which controls information communication by the communicating section 41 and executes various calculations. Based on the user information received by the communicating section 41, the controlling section 45 acquires the information about the vehicle that is stored in the storing section 42 in association with the user information. For example, the controlling section 45 identifies the vehicle owned by the user who corresponds to the user information received by the communicating section 41 based on the user information stored in the user database 44. The controlling section 45 determines that the fuel supply information that has been received by the communicating section 41 together with the user information is addressed to the identified vehicle 10.

Next, a notification process of the fuel supply information in the supply information communication system 100 will be described with reference to FIG. 2.

When determining that the supply nozzle 21 has started supplying fuel, the controlling section 28 of the fuel supply facility 20 starts a notification process control of the fuel supply information in the present embodiment. Specifically, when the supply nozzle 21 discharges an amount of fuel that is greater than or equal to the minimum amount measurable by the measuring section 24 as described above, the controlling section 28 of the fuel supply facility 20 determines that the supply nozzle 21 has started supplying fuel, thereby initiating the notification process control of the fuel supply information in the present embodiment.

In step S11, the controlling section 28 of the fuel supply facility 20 determines whether the supply of fuel has been completed. Specifically, the controlling section 28 of the fuel supply facility 20 determines whether the supply nozzle 21 has been put back to the nozzle holder in the fuel supply facility 20. When determining that the supply nozzle 21 has not been put back to the nozzle holder in the fuel supply facility 20 in step S11 (S11: NO), the controlling section 28 of the fuel supply facility 20 repeats step S11 until the that the supply nozzle 21 is put back to the nozzle holder. In contrast, when determining that the supply nozzle 21 has been put back to the nozzle holder in the fuel supply facility 20 in step S11 (S11: YES), the controlling section 28 determines that the supply of fuel by the supply nozzle 21 has been completed and proceeds to step S12.

In step S12, the controlling section 28 of the fuel supply facility 20 calculates the amount of fuel measured by the measuring section 24 from when the supply nozzle 21 started supplying fuel to when it finished the fuel supply. Specifically, the controlling section 28 of the fuel supply facility 20 calculates the amount of fuel supplied by the supply nozzle 21 by accumulating the values measured by the measuring section 24. Thereafter, the controlling section 28 of the fuel supply facility 20 proceeds to step S13.

In step S13, the controlling section 28 of the fuel supply facility 20 calculates the fee for the fuel supplied to the vehicle 10 by the supply nozzle 21 based on the amount of fuel supplied by the supply nozzle 21 and the unit price of the fuel stored in the unit price storing section 22. The fuel supply facility 20 then urges the user to make settlement with the portable manipulation terminal 30 by sending a message to the user using a display or a speaker (neither is shown). That is, the user is charged for the fuel. Thereafter, when the portable manipulation terminal 30 is held inside the communication range of the communicating section 25 of the fuel supply facility 20, the settling section 26 transmits, from the communicating section 25 to the portable manipulation terminal 30 via short distance wireless communication, the information indicating the charged fee calculated by the controlling section 28 regarding the fuel supplied to the vehicle 10. Subsequently, the process by the fuel supply facility 20 is suspended.

In the portable manipulation terminal 30, when the first communicating section 31 receives information from the communicating section 25 of the fuel supply facility 20, which charges the fee for fuel, the controlling section 36 starts the process of step S14. When the information about the charged fee for fuel received by the first communicating section 31 of the portable manipulation terminal 30 is input to the controlling section 36 of the portable manipulation terminal 30 in step S14, the controlling section 36 executes the payment application program stored in the storing section 34. When the above payment application program executes payment of the fuel fee using the registered electronic settlement means, the controlling section 36 transmits, from the first communicating section 31 to the communicating section 25 of the fuel supply facility 20, the information indicating that the fuel fee has been paid and the information of the terminal number of the portable manipulation terminal 30. Subsequently, the process by the portable manipulation terminal 30 is suspended.

Thereafter, when the communicating section 25 of the fuel supply facility 20 receives, from the first communicating section 31 of the portable manipulation terminal 30, the information indicating that the fuel fee has been paid and the information about the terminal number of the portable manipulation terminal 30, the controlling section 28 of the fuel supply facility 20 starts the process of step S15. In step S15, the controlling section 28 of the fuel supply facility 20 inputs the information received by the communicating section 25, which indicates that the fuel fee has been paid, to the settling section 26. This allows the settling section 26 to determine that the settlement of the fuel fee has been completed. Thereafter, the controlling section 28 of the fuel supply facility 20 proceeds to step S16.

In step S16, the controlling section 28 of the fuel supply facility 20 generates fuel supply information. Specifically, the controlling section 28 of the fuel supply facility 20 generates information that includes information indicating that fuel has been supplied to the vehicle 10, the amount of the fuel supplied to the vehicle 10, the unit price of the fuel supplied to the vehicle 10, the components of the fuel supplied to the vehicle 10, and the fee for the fuel supplied to the vehicle 10. Then, the controlling section 28 of the fuel supply facility 20 associates the terminal information of the portable manipulation terminal 30 received in step S15 with the generated fuel supply information, and transmits the terminal information and the fuel supply information from the communicating section 25 to the first communicating section 31 of the portable manipulation terminal 30 via short distance wireless communication. That is, the controlling section 28 transmits the terminal information and the fuel supply information, which are associated with each other, to the portable manipulation terminal 30, which is held over the communicating section 25. By associating the terminal information of the portable manipulation terminal 30 with the fuel supply information, the fuel supply facility 20 transmits the fuel supply information to the vehicle 10 that is identified by the terminal information of the portable manipulation terminal 30. Subsequently, the process related to the current fuel supply executed by the fuel supply facility 20 is finished.

Thereafter, when receiving the fuel supply information, the controlling section 36 of the portable manipulation terminal 30 starts the process of step S17. In step S17, the first communicating section 31 of the portable manipulation terminal 30 receives the fuel supply information addressed to the portable manipulation terminal 30. If the terminal number associated with the fuel supply information is different from the terminal number of the portable manipulation terminal 30, the first communicating section 31 discards the received fuel supply information. Thereafter, the controlling section 36 of the portable manipulation terminal 30 proceeds to step S18.

In step S18, the controlling section 36 of the portable manipulation terminal 30 transmits the fuel supply information received by the first communicating section 31 and the terminal number of the portable manipulation terminal 30 to the server 40 via the external communication network 50. Subsequently, the process related to the current fuel supply executed by the portable manipulation terminal 30 is finished.

Thereafter, when the communicating section 41 of the server 40 receives the fuel supply information and the terminal number of the portable manipulation terminal 30, which is user information, the controlling section 45 of the server 40 starts the process of step S19. In step S19, the communicating section 41 inputs the fuel supply information and the terminal number of the portable manipulation terminal 30 to the controlling section 45 of the server 40. Thereafter, the controlling section 45 of the server 40 proceeds to step S20.

In step S20, the controlling section 45 of the server 40 verifies the input terminal number of the portable manipulation terminal 30 against the user database 44 of the storing section 42, thereby identifying the vehicle 10 that is associated with the terminal number of the portable manipulation terminal 30. Thereafter, the controlling section 45 of the server 40 proceeds to step S21.

In step S21, the controlling section 45 of the server 40 transmits the fuel supply information to the identified vehicle 10 via the external communication network 50. Subsequently, the process related to the current fuel supply executed by the server 40 is finished.

Thereafter, when the communicating section 13 of the communication module 11 mounted on the vehicle 10 receives the fuel supply information that has been transmitted from the server 40 to the vehicle 10, the communication module 11 starts the process of step S22. In step S22, the communication ECU 14A of the communication module 11 stores the fuel supply information received by the communicating section 13 in the storing section 16 together with the time and date of the reception of the fuel supply information. Also, the fuel supply information stored in the storing section 16 is output to the fuel ECU 14B. If the communicating section 13 of the communication module 11 receives fuel supply information that is not addressed to the vehicle 10 that mounts the communicating section 13, the communication ECU 14A discards the received fuel supply information. Thereafter, the communication module 11 mounted on the vehicle 10 proceeds to step S23.

In step S23, the controlling section 15 of the communication ECU 14A displays the fuel supply information stored in the storing section 16 on the display section 18 of the vehicle 10. Thereafter, the communication ECU 14A of the communication module 11 mounted on the vehicle 10 finishes the notification process control of the fuel supply information.

The communication ECU 14A transmits the fuel supply information stored in the storing section 16 of the communication ECU 14A to the respective ECUs 14 via the CAN communication line 17. When receiving the information indicating that fuel has been supplied to the vehicle 10, the fuel ECU 14B determines that fuel has been supplied to the vehicle 10 regardless of the detection value of the liquid level sensor of the fuel tank 12. When determining that fuel has been supplied to the vehicle 10, the fuel ECU 14B executes various types of processes.

When determining that fuel has been supplied to the vehicle 10, the fuel ECU 14B determines the property of the fuel stored in the fuel tank 12 based on the information about the property of the fuel included in the fuel supply information. For example, when alcohol fuel is supplied, the fuel ECU 14B calculates the alcohol concentration of the alcohol fuel stored in the fuel tank 12 based on the amount and the alcohol concentration of the fuel stored in the fuel tank 12 before fuel is supplied and the amount and the alcohol concentration of the fuel newly supplied to the fuel tank 12.

For example, when gasoline fuel is supplied, the fuel ECU 14B calculates the octane number of the gasoline stored in the fuel tank 12 based on the amount and the octane number of the gasoline stored in the fuel tank 12 before fuel is supplied and the amount and the octane number of the gasoline newly supplied to the fuel tank 12.

Further, when determining that fuel has been supplied to the vehicle 10, the fuel ECU 14B calculates the remaining amount of fuel stored in the fuel tank 12 based on the information about the supplied amount of fuel included in the fuel supply information. The calculated remaining amount of fuel is used as a value for correcting the internal pressure when detecting leakage of fuel vapor.

Further, when determining that fuel has been supplied to the vehicle 10, the fuel ECU 14B calculates the total cost of the fuel stored in the fuel tank 12 based on the information about the unit price of the fuel included in the fuel supply information. Specifically, the fuel ECU 14B calculates the total cost of the fuel by adding the cost of the fuel that has been newly supplied to the fuel tank 12 to the cost of the fuel stored in the fuel tank 12 before the fuel supply.

The operation and advantages of the first embodiment will be described below.

(1) In general, the fee for fuel is charged in correspondence with the supplied amount of fuel. Thus, the measuring section 24 of the fuel supply facility 20 relatively accurately measures the supplied amount of fuel. It is therefore considered that whether fuel has been supplied is more accurately detected by using the detection result of the measuring section 24 of the fuel supply facility 20 than by detecting displacement of the liquid level of the fuel tank 12 with the liquid level sensor of the fuel tank 12. Particularly, when a relatively small amount of fuel is supplied to the fuel tank 12 or when the vehicle 10 is in a stopped and tilted state, the liquid level sensor of the fuel tank 12 cannot be expected to accurately determine whether fuel has been supplied to the fuel tank 12.

In the first embodiment, when the fuel supply facility 20 supplies fuel to the vehicle 10, the communicating section 13 of the communication module 11 mounted on the vehicle 10 receives information indicating that fuel has been supplied to the vehicle 10. The information indicating that the fuel has been supplied is based on the measurement result of the measuring section 24 of the fuel supply facility 20, which is capable of relatively accurately measuring the supplied amount of fuel. Thus, even in the vehicle 10, in which the liquid level sensor in the fuel tank 12 is capable of determining whether fuel has been supplied to the vehicle 10, the received information that indicates that fuel has been supplied to the vehicle 10 can be additionally utilized. This allows the supply of fuel to the vehicle 10 to be determined highly reliably.

Specifically, even in a case in which the liquid level in the fuel tank 12 scarcely changes before and after supply of fuel, the information that indicates that fuel has been supplied to the vehicle 10 can be utilized. This allows the vehicle 10 to acquire the fact that fuel has been supplied. As a result, the vehicle 10 readily starts control processes to be executed on condition that fuel has been supplied to the vehicle 10.

(2) For example, in a case in which the liquid level in the fuel tank 12 can be detected accurately, it is theoretically possible to calculate the supplied amount of fuel by comparing the liquid level before the supply of fuel with that after the supply of fuel. In reality, however, the fuel in the fuel tank 12 may become wavy and froth up due to supply of fuel. The liquid level is not expected to be detected sufficiently accurately to allow the supplied amount of fuel to be calculated. Further, if the shape of the fuel tank 12 is complicated or if the vehicle 10 is in a stopped and tilted state, it is practically impossible to calculate the supplied amount of fuel based on the liquid level.

In this regard, according to the first embodiment, the communication module 11 of the vehicle 10 receives the supplied amount of fuel as a part of the fuel supply information. Thus, the supplied amount of fuel can be easily and accurately acquired without referring to the liquid level in the fuel tank 12.

(3) The unit price of fuel can vary each time fuel is supplied. According to the first embodiment, the communication module 11 receives the unit price of the fuel supplied to the vehicle 10. Based on the received unit price, the unit price of fuel at different times can be acquired. Thus, the total cost of the fuel stored in the fuel tank 12 of the vehicle 10 can be calculated based on the unit price of fuel when the fuel is supplied to the vehicle 10. As a result, the monetary value of the fuel stored in the fuel tank 12 of the vehicle 10 is acquired.

(4) The components of fuel can vary each time fuel is supplied. According to the first embodiment, the communication module 11 receives the information about the components of the fuel supplied to the vehicle 10. Based on the received information, the components of fuel at different times can be acquired. Thus, no additional sensor needs to be provided in the fuel tank 12 of the vehicle 10 when the control of the internal combustion engine is changed depending on the components of the fuel stored in the fuel tank 12. That is, the control of the internal combustion engine can be changed based on the components of the newly supplied fuel.

(5) The first embodiment allows the information about the fee for the fuel supplied to the vehicle 10 to be acquired in the vehicle 10. For example, when different users use a single vehicle 10, the users use the vehicle 10 at different times. The first embodiment acquires which of the users has paid what amount of the fee for fuel used in the vehicle 10.

(6) According to the first embodiment, the identifying information for identifying the vehicle 10 at the time of settlement using the settling section 26 is obtained as the user information of the vehicle 10. Thus, it is not necessary to provide a device separate from the settling section 26 to obtain the identifying information for identifying the vehicle 10 or to force the user to input the identifying information, for example, solely for the purpose of identifying the vehicle 10. Since the obtained terminal number of the portable manipulation terminal 30 is associated with the information about the vehicle 10 in the server 40, the fuel supply facility 20 can identify the vehicle 10 even if it is not storing a database for identifying the vehicle 10.

(7) According to the first embodiment, the obtaining section 27 obtains the terminal information of the portable manipulation terminal 30, which is the terminal information of the portable manipulation terminal 30 that is owned by the user of the vehicle 10 to which fuel has been supplied by the supply nozzle 21. In this manner, the fuel supply information related to the fact that fuel has been supplied to the vehicle 10 by the supply nozzle 21 is transmitted to the portable manipulation terminal 30 owned by the user of the vehicle 10. Thus, even if the obtaining section 27 cannot directly obtain the information for identifying the vehicle 10 to which the supply nozzle 21 has supplied fuel, the fuel supply information can be transmitted to the vehicle 10 to which the supply nozzle 21 has supplied the fuel. Therefore, from the standpoint of the user of the vehicle 10, the use of the settling section 26 at the time of settlement allows the vehicle 10 to be identified in the first embodiment.

Second Embodiment

Figure 3:
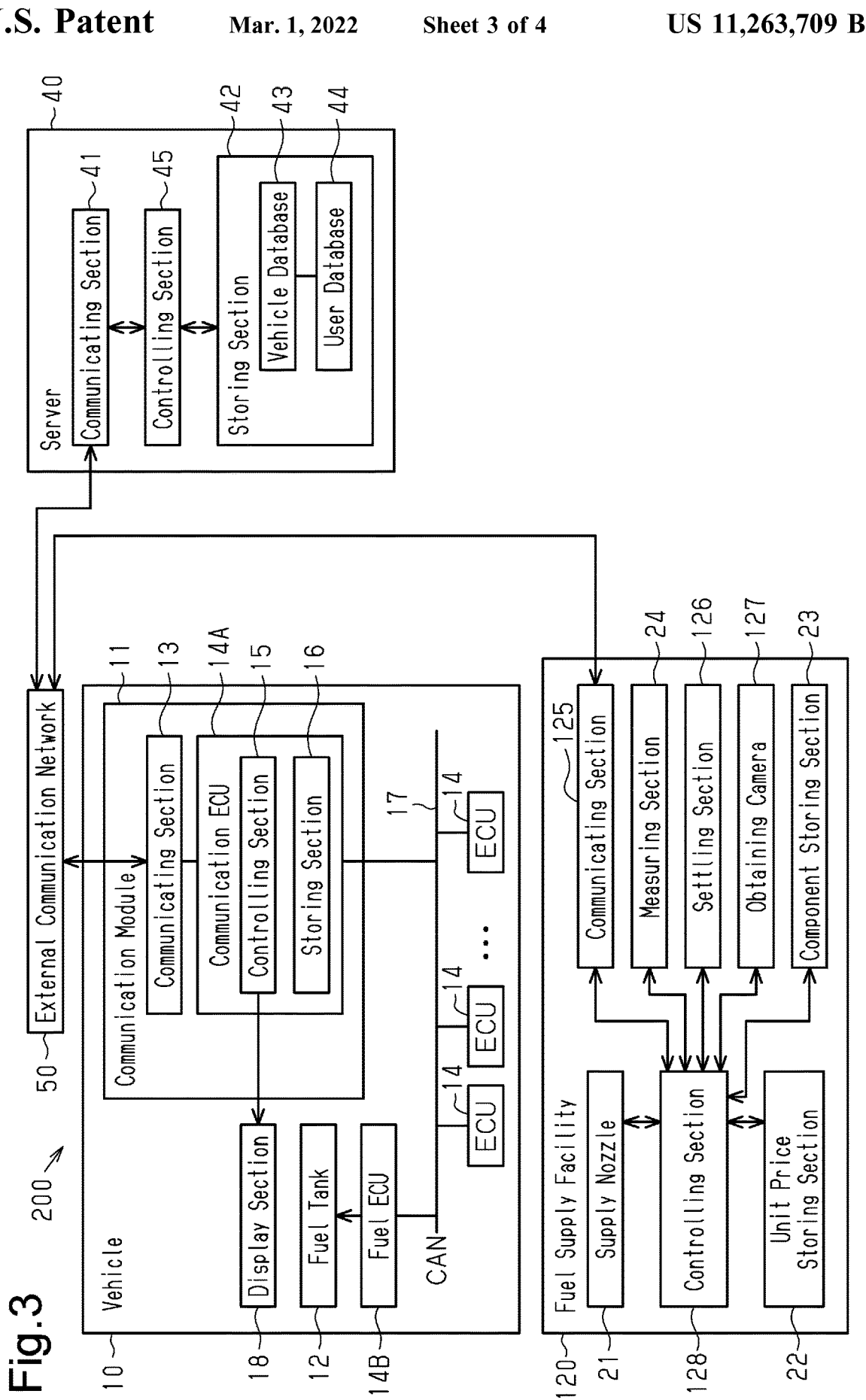
FIG. 3 is a schematic diagram of a supply information communication system according to a second embodiment of the present disclosure.
Figure 4:
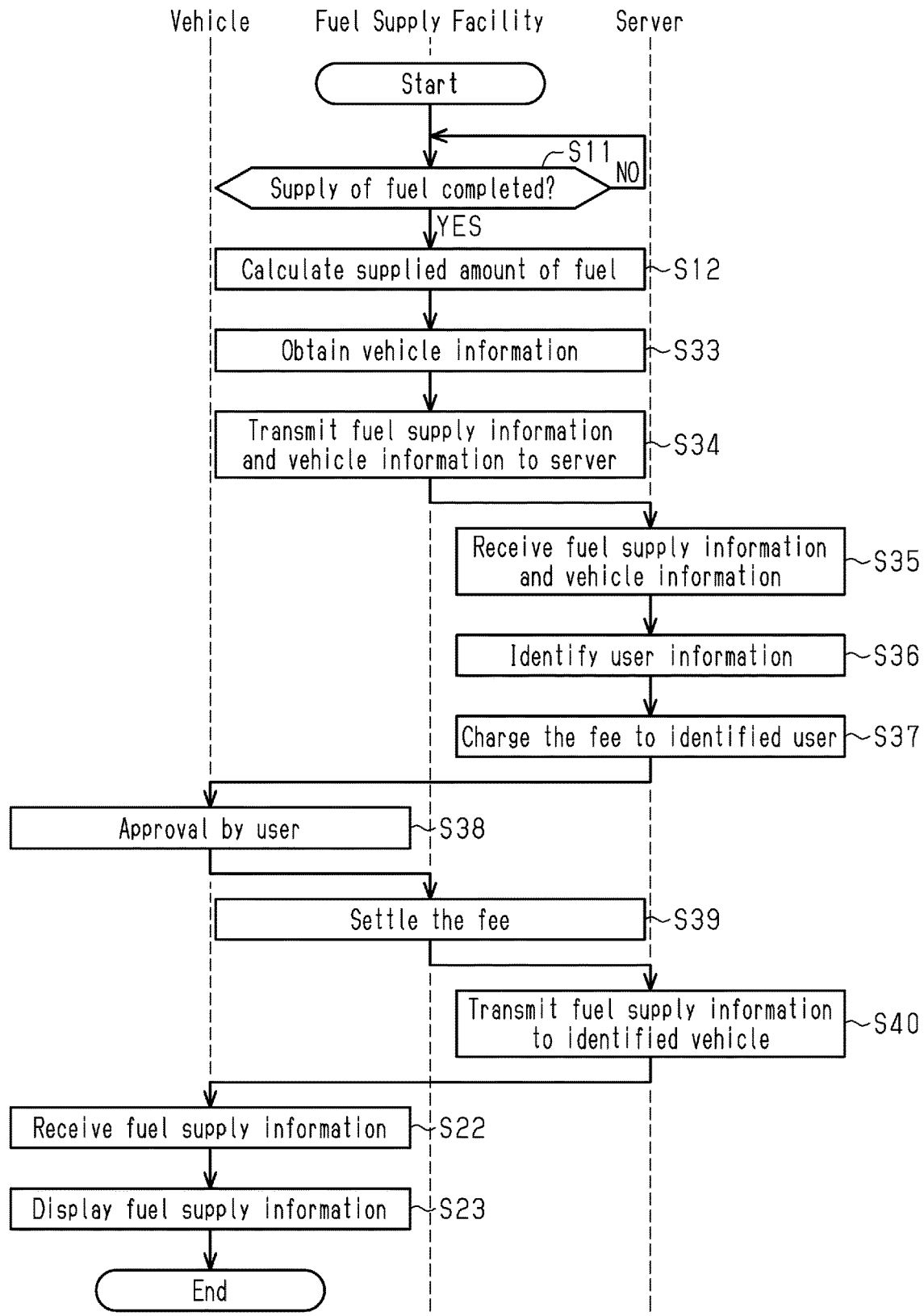
FIG. 4 is a flowchart showing a notification process of supply information according to the second embodiment.

A supply information communication system 200 according to a second embodiment of the present disclosure will now be described with reference to FIGS. 3 and 4. In the second embodiment, like or the same reference numerals are given to those components that are like or the same as the corresponding components of the first embodiment. Specific description of these components is omitted or simplified.

First, the overall configuration of the supply information communication system 200 will be described. As shown in FIG. 3, the supply information communication system 200 includes a communication module 11 mounted on a vehicle 10, a fuel supply facility 120, and a server 40, which aggregates and stores information about the vehicle 10. The communication module 11, the fuel supply facility 120, and the server 40 are configured to communicate information with each other via an external communication network 50.

The fuel supply facility 120 includes a supply nozzle 21, a unit price storing section 22, a component storing section 23, and a measuring section 24. Also, fuel supply facility 120 includes a communicating section 125, which communicates information with communication module 11 mounted on the vehicle 10 and the server 40 via the external communication network 50.

The fuel supply facility 120 includes a settling section 126, which settles the fee for fuel supplied to the vehicle 10 calculated by a controlling section 128 discussed below. Specifically, the settling section 126 transmits information related to charging of the fee for fuel to the server 40 from the communicating section 125 via the external communication network 50. When receiving a notification indicating approval of the settlement from the vehicle 10 via the communicating section 125, the settling section 126 determines that the settlement of the fee for fuel has been completed.

The fuel supply facility 120 includes an obtaining camera 127, which obtains information for identifying the vehicle 10 that is a supply destination of fuel discharged by the supply nozzle 21. Specifically, the obtaining camera 127 obtains the license plate number of the vehicle 10 as the identifying information for identifying the vehicle 10. In the present embodiment, the obtaining camera 127 functions as an obtaining section.

The fuel supply facility 120 includes the controlling section 128, which controls the operation of the supply nozzle 21 and performs various calculations. The controlling section 128 generates fuel supply information to be transmitted by the communicating section 125.

The controlling section 128 transmits the fuel supply information generated by the controlling section 128 together with the license plate number of the vehicle 10 obtained by the obtaining camera 127 from the communicating section 125 to the server 40 via the external communication network 50. In this manner, the communicating section 125 and the controlling section 128 operate as a transmitting section of the fuel supply facility 120 that is configured to transmit the supply information including information indicating that fuel has been supplied to the vehicle 10 that has been identified using the identifying information for identifying the supply destination of fuel.

The communicating section 41 of the server 40 communicates information with the fuel supply facility 120 and the communication module 11 via the external communication network 50. In the server 40, when the communicating section 41 receives the license plate number of the vehicle 10 from the fuel supply facility 120, the license plate number of the vehicle 10 is transmitted to the controlling section 45. The controlling section 45 thus acquires the license plate number of the vehicle 10. Based on the license plate number of the vehicle 10, the controlling section 45 identifies the information about the vehicle 10 and the user of the vehicle 10 that are stored in the storing section 42 in association with the license plate number of the vehicle 10. The server 40 then charges the user of the identified vehicle 10 the fee for the fuel supplied to the vehicle 10. In the present embodiment, the server 40 transmits to the identified vehicle 10 the charge information of the fee for the fuel supplied to the vehicle 10.

When the user of the vehicle 10 approves the settlement in the vehicle 10, the vehicle 10 transmits to the fuel supply facility 120 information indicating that the settlement of the fee has been completed by the electronic settlement means. When the server 40 receives the information indicating the completion of the settlement of the fee from the fuel supply facility 120, the settling section 126 determines that the settlement of the fuel fee has been completed.

Next, a notification process of the fuel supply information in the supply information communication system 200 will be described with reference to FIG. 4.

As in the first embodiment, when determining that the supply nozzle 21 has started supplying fuel, the controlling section 128 of the fuel supply facility 120 starts a notification process control of the fuel supply information in the present embodiment. Thereafter, the controlling section 128 of the fuel supply facility 120 executes the processes of steps S11 and S12. These processes are the same as those of steps S11 and S12 in the first embodiment. Thereafter, the controlling section 128 of the fuel supply facility 120 proceeds to step S33.

In step S33, the controlling section 128 of the fuel supply facility 120 uses the obtaining camera 127 to capture an image of the license plate number of the vehicle 10 to which fuel has been supplied. Accordingly, the obtaining camera 127 obtains the license plate number of the vehicle 10 as the identifying information for identifying the vehicle 10. Thereafter, the controlling section 128 of the fuel supply facility 120 proceeds to step S34.

In step S34, the controlling section 128 of the fuel supply facility 120 generates fuel supply information. Specifically, the controlling section 128 of the fuel supply facility 120 generates information that includes information indicating that fuel has been supplied to the vehicle 10, the amount of the fuel supplied to the vehicle 10, the unit price of the fuel supplied to the vehicle 10, the components of the fuel supplied to the vehicle 10, and the fee for the fuel supplied to the vehicle 10. The controlling section 128 of the fuel supply facility 120 generates information about the fee charged to the user of the vehicle 10, together with the generated fuel supply information. The controlling section 128 of the fuel supply facility 120 transmits, to the server 40 from the communicating section 125 via the external communication network 50, the information about the license plate number of the vehicle 10 obtained in step S34, the generated fuel supply information, and the fee charged to the user of the vehicle 10, while associating these with each other. By associating the license plate number with the fuel supply information, the fuel supply facility 120 transmits the fuel supply information to the vehicle 10 that is identified by the license plate number. Subsequently, the process by the fuel supply facility 120 is suspended.

Thereafter, when the communicating section 41 of the server 40 receives the fuel supply information, the fee charged to the user of the vehicle 10, the information about the license plate number of the vehicle 10, which is the information about the vehicle 10, the controlling section 45 of the server 40 starts the process of step S35. In step S35, the communicating section 41 inputs the fuel supply information and the license plate number of the vehicle 10 to the controlling section 45 of the server 40. Thereafter, the controlling section 45 of the server 40 proceeds to step S36.

In step S36, the controlling section 45 of the server 40 verifies the input license plate number of the vehicle 10 against the vehicle database 43 of the storing section 42, thereby identifying the vehicle 10 and the user of the vehicle 10 that are associated with the license plate number of the vehicle 10. Thereafter, the controlling section 45 of the server 40 proceeds to step S37.

In step S37, the controlling section 45 of the server 40 transmits to the identified vehicle 10 the information about charging of the fee for fuel from the user of the vehicle 10 via the external communication network 50. Subsequently, the process by the server 40 is suspended.

Thereafter, when the communicating section 13 of the vehicle 10 receives the information about charging of the fee for fuel from the user of the vehicle 10, the communication module 11 of the vehicle 10 proceeds to step S38. In step S38, the controlling section 15 of the communication ECU 14A of the communication module 11 displays the information about the fee for fuel charged to the user of the vehicle 10 on the display section 18. Specifically, the display section 18 displays the type of the fuel supplied to the vehicle 10, the amount of the fuel supplied to the vehicle 10, the unit price of the fuel supplied to the vehicle 10, and the fee for the fuel supplied to the vehicle 10. Accordingly, the vehicle 10 urges the user to approve the settlement, and the fee is charged to the user. Thereafter, when the user approves the settlement of the fee for fuel by operating an operation button (not shown) of the vehicle 10, the communicating section 13 of the communication module 11 transmits information indicating the approval of the settlement by the user to the communicating section 125 of the fuel supply facility 120 via the external communication network 50. Subsequently, the process by the communication module 11 of the vehicle 10 is suspended.

Thereafter, when the communicating section 125 of the fuel supply facility 120 receives the information about the approval of the settlement by the user, the communicating section 125 of the fuel supply facility 120 proceeds to step S39. In step S39, the communicating section 125 inputs the information about the approval of the settlement by the user to the settling section 126. When receiving the information about the approval of the settlement by the user, the settling section 126 determines that the settlement of the fee for the fuel supplied to the vehicle 10 has been completed. Then, the controlling section 128 of the fuel supply facility 120 transmits the information indicating the completion of the settlement of the fee for fuel to the communicating section 41 of the server 40 via the external communication network 50. Subsequently, the process related to the current fuel supply executed by the fuel supply facility 120 is finished.

Thereafter, when the communicating section 41 of the server 40 receives the information indicating the completion of the settlement of the fuel fee, the communicating section 41 of the server 40 proceeds to step S40. In step S40, the controlling section 45 of the server 40 transmits the fuel supply information to the identified vehicle 10. Subsequently, the process related to the current fuel supply executed by the server 40 is finished.

Thereafter, when the communicating section 13 of the communication module 11 mounted on the vehicle 10 receives the fuel supply information that has been transmitted from the server 40 to the vehicle 10, the communication module 11 starts the process of steps S22 and S23. These processes are the same as those of steps S22 and S23 in the first embodiment. When the process of step S23 is completed, the communication ECU 14A of the communication module 11 mounted on the vehicle 10 finishes the notification process control of the fuel supply information.

In addition to the advantages (1) to (5) of the first embodiment, the second embodiment has the following advantages.

(8) According to the second embodiment, the obtaining camera 127 obtains the license plate number of the vehicle 10 as the identifying information for identifying the vehicle 10. This allows the vehicle 10 to be identified without relying on information about the user database 44 in the storing section 42 of the server 40. Also, for example, even if the information about two or more vehicles 10 is associated with a single piece of user information, the use of the obtaining camera 127 allows the information about one of the vehicles 10 to be obtained directly. This allows the vehicle 10 to be identified.

(9) The second embodiment urges the user of the vehicle 10 to approve settlement. After the user approves the settlement, the server 40 transmits the fuel supply information to the vehicle 10. In this manner, the user acknowledges that the fuel has been supplied to the vehicle 10. This prevents the settlement of the fee for fuel from being executed against the intension of the user or the fuel supply information from being transmitted.

The above-described embodiments may be modified as follows. The above-described embodiments and the following modifications can be combined as long as the combined modifications remain technically consistent with each other.

In each of the above-described embodiments, the fuel supply information simply needs to include information indicating that fuel has been supplied, and other pieces of information may be omitted as necessary. For example, the fuel supply information may lack any or all of the information about the supplied amount of fuel, the component information of fuel, and the information about the settled fee.

The fuel supply information may include information other than the types of information exemplified in the above-described embodiments. For example, the fuel supply information may include the name of the store that has supplied fuel or the coordinate of the place where the fuel is supplied.

The fuel supply information received by the communication module 11 mounted on the vehicle 10 may be used in any control processes other than those in the above-described embodiments.

In the above-described embodiments, the fuel tank 12 of the vehicle 10 does not necessarily incorporate a liquid level sensor. In this case, the vehicle 10 determines whether fuel has been supplied by receiving the fuel supply information.

In the above-described embodiments, when the vehicle 10 determines whether fuel has been supplied, the vehicle 10 may determine that fuel has been supplied together with the detection result of the liquid level sensor. For example, the fuel ECU 14B may determine that fuel has been supplied to the vehicle 10 when the liquid level detected by the liquid level sensor has not been lowered and the fuel ECU 14B has received the fuel supply information.

In the above-described embodiments, the liquid supplied to the vehicle 10 is not limited to fuel. For example, the liquid supplied to the vehicle 10 may be urea water supplied as the reducing agent to the exhaust purification catalyst, windshield washer fluid, and engine oil. The technique of supplying fuel according to the above-described embodiments can be applied to any liquid supplied to the vehicle 10. If the notification process of the supply information is employed for urea water, windshield washer fluid, or engine oil, control may be executed to urge the user to replace or refill the liquid after a predetermined period from the reception of the supply information.

In the above-described embodiments, the fuel supply information received by the vehicle 10 does not necessarily need to be displayed on the display section 18. Alternatively, only part of the fuel supply information may be displayed on the display section 18.

In the first embodiment, when the server 40 identifies the vehicle from the user information, the user information is not limited to the terminal number of the portable manipulation terminal 30. For example, the phone number of the portable manipulation terminal 30, the name of the user, a payment card number, the registration information of a payment application, the registration information of a car rental application. The user information simply needs to be transmitted when the fuel supply information is transmitted via the external communication network 50 from the portable manipulation terminal 30. In a case where the owner of the vehicle 10 lends the vehicle 10 to the user, the user applies for lending to the owner of the vehicle 10, the phone number of the portable manipulation terminal 30 or the information about the name of the user may be provided to the owner of the vehicle 10. In this case, the information associates the user to whom the vehicle 10 is lent and the vehicle 10 lent to the user with each other.

In the above-described embodiments, the information for identifying the vehicle 10 may be input by the user. For example, the user may input the user information or the registration number of the vehicle 10 using an input device installed in the fuel supply facility 20. In this case, the information from the input device simply needs to be input to the obtaining section 27.

The electronic settlement means is not limited to the ones described in the above-described embodiments. For example, the electronic settlement means may be online credit card settlement or debit card settlement. Alternatively, the electronic settlement means may be a post-payment type electronic money associated with a credit card. When a post-payment type settling means is used as the electronic settlement means, the fuel supply facility 20 of the first embodiment and the fuel supply facility 120 of the second embodiment must be connected to the credit card company or the like. In such a case, the settling section 26 and the settling section 126 check the information about the settlement content with the credit card company to determine the completion of the settlement.

In the second embodiment, the means of settlement does not necessarily need to be an electronic settlement means. For example, the user of the vehicle 10 may make payment in cash at the fuel supply facility 120. This modification can be implemented by simply omitting steps S36 to S39, which are related to electronic settlement, since the obtaining camera 127 obtains the license plate number of the vehicle 10, and the fuel supply information thus can be transmitted to the vehicle 10 in step S40.

In the above-described embodiments, the determination and timing of the completion of settlement may be changed as necessary in accordance with the means of settlement selected by the user.

In the above-described embodiments, the fuel fee may be charged to the owner of the vehicle 10, not to the user. For example, the fee for the fuel supplied to the vehicle 10 may be charged to the one who owns the vehicle 10 and usually lends the vehicle 10 to a user. When the lender of the vehicle 10, not users, pays the fee for the fuel supplied to the vehicle 10, the lender of the vehicle 10 can easily acquire the amount that should be paid by each user. Also, when the fuel fee is charged to the lender who owns the vehicle 10 as described above, the vehicle 10 may acquire the unit price of the fuel in addition to the amount of fuel supplied to the vehicle 10. Therefore, if fuel is supplied multiple times and the user is different each time, the lender can acquire which user has paid what amount.

In the first embodiment, the supply information communication system 100 may lack the server 40. For example, it is preferable that pairing between the vehicle 10 and the portable manipulation terminal 30 have been completed so that the portable manipulation terminal 30 can communicate with the communicating section 13 of the vehicle 10 via Bluetooth (registered trademark) or the like. In this case, the portable manipulation terminal 30 can identify the vehicle 10 even if the server 40 does not identify the vehicle 10.

If the vehicle 10 is paired in advance with the portable manipulation terminal 30 so that the portable manipulation terminal 30 can communicate with the communicating section 13 of the vehicle 10, a fuel fee payment application may determine that fuel has been supplied to the vehicle 10 and the fee for the supplied fuel in the portable manipulation terminal 30. In this case, when the portable manipulation terminal 30 receives the charged fuel fee information from the fuel supply facility 20, the fuel fee payment application of the portable manipulation terminal 30 executes payment by the registered electronic settlement means upon approval by the user. That is, upon approval by the user, the fuel fee payment application determines that the settlement of the fuel fee has been completed by the payment of the fuel fee by the user, acquires the paid amount, and determines that the fuel has been supplied. The portable manipulation terminal 30 simply needs to transmit to the registered vehicle 10 the information indicating that fuel has been supplied to the vehicle 10 and the information about the fuel fee. That is, the supply information communication system 100 includes the communication module 11 mounted on the vehicle 10 and the portable manipulation terminal 30, which is capable of communicating with the communication module 11. The communication module 11 is mounted on the vehicle 10 to which liquid is supplied from the fuel supply facility 20 for supplying fuel to the vehicle 10. In this case, the portable manipulation terminal 30 stores the fuel fee payment application, and the application functions as a settling section that settles the fuel fee with the fuel supply facility 20. That is, launching the application allows the controlling section 36 of the portable manipulation terminal 30 to function as a settling section that is configured to be capable of settling the fee for fuel between the portable manipulation terminal 30 and the fuel supply facility 20. When the fuel fee is settled, the first communicating section 31, which functions as a transmitting section of the portable manipulation terminal 30, transmits fuel supply information including information that indicates that fuel has been supplied to the vehicle 10 that is registered in the portable manipulation terminal 30 in advance.

In the second embodiment, the supply information communication system 200 may lack the server 40. For example, the fuel supply facility 120 may identify the communication address of the communicating section 13 of the communication module 11 mounted on the vehicle 10 from the license plate number of the vehicle 10. Also, the fuel supply facility 120 simply needs to identify a vehicle parked in a certain range about the fuel supply facility 120 as the vehicle 10, to which fuel is supplied. In this case, the communicating section 125 of the fuel supply facility 120 simply needs to transmit the fuel supply information to the communicating section 13 of the communication module 11 of the identified vehicle 10 via the external communication network 50.

In the first embodiment, the communication means between the fuel supply facility 20 and the portable manipulation terminal 30 is not limited to short distance wireless communication. For example, the fuel supply facility 20 and the portable manipulation terminal 30 may communicate with each other via the external communication network 50.

In the above-described embodiments, the supplying section is not limited to the supply nozzle 21. For example, a measured amount of fuel may be put in a bottle, and the fuel may be supplied to the fuel tank 12 from the mouth of the bottle using a pump. The supply is completed when the bottle is empty. In this case, the pump functions as a supplying section.

Various determinations from the beginning to the end of fuel supply of the fuel supply facility 20 are not limited to those discussed in the above-described embodiments. For example, fuel supply may be determined to have been started when the lever of the supply nozzle 21 is squeezed. Also, in a case where the user specifies a certain amount of fuel, fuel supply may be determined to have been completed when that certain amount of fuel has been discharged.

The various types of controlling sections in the present disclosure are configured by the ECUs in the above-described embodiments. The various controllers can be constructed by devices that include a for example, a processor and a storing section including a ROM and execute software processing, but are not limited to this configuration. For example, at least part of the processes executed by the software in the above-illustrated embodiment may be executed by hardware circuits dedicated to executing these processes (such as ASIC). That is, each controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A supply information communication system comprising:
    a liquid supply facility configured to supply liquid to a vehicle; and
    a communication module configured to be mounted on the vehicle, to which the liquid is supplied from the liquid supply facility, wherein
    the liquid supply facility includes
        a supplying section configured to discharge the liquid,
        an obtaining section configured to obtain identifying information for identifying the vehicle that is a supply destination of the liquid discharged by the supplying section, and
        a transmitting section configured to transmit data including supply information to the vehicle identified by the identifying information, the supply information including information indicating that the liquid has been supplied, the communication module includes
        a receiving section configured to receive the data including the supply information addressed to the vehicle on which the communication module is mounted, and
        a storing section configured to store the received data including the supply information, and
    the communication module is configured to transmit the stored data including the supply information to a fuel ECU (Electronic Control Unit) mounted on the vehicle, wherein the fuel ECU is configured to determine that the liquid is supplied to the vehicle based on the data including the supply information.

2. The supply information communication system according to claim wherein
    the liquid supply facility includes a measuring section configured to measure a supplied amount of the liquid discharged by the supplying section to the vehicle that has been identified by the identifying information, and
    the supply information includes information about the supplied amount of the liquid that has been measured by the measuring section.

3. The supply information communication system according to claim 1, wherein
the liquid supply facility includes a unit price storing section configured to store information about a unit price of the liquid discharged by the supplying section, and
the supply information includes the information about the unit price of the liquid at the time when the liquid is supplied to the vehicle identified by the identifying information.

4. The supply information communication system according to claim 1, wherein
the liquid supply facility includes a component storing section configured to store information about components of the liquid discharged by the supplying section, and
the supply information includes the information about the components of the liquid at the time when the liquid is supplied to the vehicle identified by the identifying information.

5. The supply information communication system according to claim 1, wherein
the liquid supply facility includes a settling section configured to settle a fee for xe liquid discharged by the supplying section to the vehicle, and
the supply information includes information about the fee that has been settled using the settling section.

6. The supply information communication system according to claim 5, wherein the obtaining section is configured to obtain, as the identifying information, information for identifying a user, the information having been obtained by the settling section at the time when the fee is settled using the settling section.

7. The supply information communication system according to claim 1, further comprising a server configured to be connected to the communication module mounted on the vehicle via an external communication network, wherein
the server stores information about the vehicle and user information of the vehicle, the information about the vehicle and the user information of the vehicle being associated with each other,
the obtaining section of the liquid supply facility is configured to obtain, as the identifying information, the user information of the vehicle to which the liquid has been discharged by the supplying section,
the transmitting section of the liquid supply facility is configured to transmit the user information in association with the supply information, and
the server is configured to identify the vehicle based on the received user information and to transmit the supply information corresponding to the identified vehicle to the identified vehicle.

8. The supply information communication system according to claim 2, wherein
the fuel ECU is configured to calculate a remaining amount of fuel stored in a fuel tank based on the data including the supply information.

9. A supply information communication system comprising:
a communication module; and
a portable manipulation terminal capable of communicating with the communication module, wherein
the communication module is mounted on a vehicle to which liquid is supplied from a liquid supply facility configured to supply the liquid to the vehicle,
the portable manipulation terminal includes
a settling section configured to be capable of settling a fee for the liquid between the portable manipulation terminal and the liquid supply facility, and
a transmitting section configured such that, when the settling section settles the fee for the fuel, the transmitting section transmits data including supply information to a vehicle that is registered in the portable manipulation terminal in advance, the supply information including information that indicates that the liquid has been supplied to the vehicle,
the communication module includes
a receiving section configured to receive the data including the supply information addressed to the vehicle on which the communication module is mounted, and
a storing section configured to store the data including the supply information received by the receiving section, and
the communication module is configured to transmit the stored data including the supply information to a fuel ECU mounted on the vehicle, wherein the fuel ECU is configured to determine that the liquid is supplied to the vehicle based on the data including the supply information.

10. A communication module mounted on a vehicle, comprising:
a receiving section configured to receive data including supply information, wherein
when liquid is supplied to the vehicle from a liquid supply facility, the data including the supply information is transmitted to the vehicle on which the communication module is mounted from the liquid supply facility, and
the supply information includes information indicating that the liquid has been supplied to the vehicle; and
a storing section configured to store the data including the supply information received by the receiving section,
the communication module is configured to transmit the stored data including the supply information to a fuel ECU mounted on the vehicle, wherein the fuel ECU is configured to determine that the liquid is supplied to the vehicle based on the data including the supply information.

11. A liquid supply facility configured to supply liquid to a vehicle, comprising:
a supplying section configured to discharge the liquid to the vehicle;
an obtaining section configured to obtain identifying information, wherein the identifying information is information for identifying the vehicle that is a supply destination of the liquid discharged by the supplying section, and
a transmitting section configured to transmit data including supply information to the vehicle identified by the identifying information obtained by the obtaining section, the supply information including information indicating that the liquid has been supplied to the vehicle,
wherein the data including the supply information that has been received by the vehicle is used by a fuel ECU mounted on the vehicle to determine whether liquid has been supplied to the vehicle.

12. A supply information communication method, wherein a communication module is mounted on a vehicle to which liquid is supplied from a liquid supply facility that is configured to supply the liquid to the vehicle, the method comprising:

obtaining, by an obtaining section of the liquid supply facility, identifying information for identifying the vehicle that is a supply destination of the liquid discharged by the supplying section of the liquid supply facility;

transmitting, by a transmitting section of the liquid supply facility, data including supply information to the vehicle identified by the identifying information, the supply information including information indicating that the liquid has been supplied;

receiving, by a receiving section of the communication module, the data including the supply information addressed to the vehicle on which the communication module is mounted;

storing the received data including the supply information by a storing section of the communication module; and transmitting, by the communication module, the stored data including the supply information to a fuel ECU mounted on the vehicle, wherein the fuel ECU is configured to determine that the liquid is supplied to the vehicle based on the data including the supply information.

13. A supply information communication method, wherein a communication module is mounted on a vehicle to which liquid is supplied from a liquid supply facility that is configured to supply the liquid to the vehicle, the method comprising:

settling, by a settling section of a portable manipulation terminal capable of communicating with the communication module, a fee for the liquid between the portable manipulation terminal and the liquid supply facility;

when the settling section settles the fee for the fuel, transmitting, by a transmitting section of the portable manipulation terminal, data including supply information to a vehicle that is registered in the portable manipulation terminal in advance, the supply information including information that indicates that the liquid has been supplied to the vehicle;

receiving, by a receiving section of the communication module, the data including the supply information addressed to the vehicle on which the communication module is mounted;

storing, by a storing section of the communication module, the data including the supply information received by the receiving section, and transmitting, by the communication module, the stored data including the supply information to a fuel ECU mounted on the vehicle, wherein the fuel ECU is configured to determine that the liquid is supplied to the vehicle based on the data including the supply information.

* * * * *